(12) United States Patent
Yasuhara et al.

(10) Patent No.: US 6,848,710 B2
(45) Date of Patent: Feb. 1, 2005

(54) AIRBAG SYSTEM

(75) Inventors: Fumitoshi Yasuhara, Wako (JP); Koji Ikeda, Wako (JP); Naoki Kawajiri, Wako (JP); Takeru Otsuka, Wako (JP); Kazuaki Miyamoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/192,122

(22) Filed: Jul. 10, 2002

(65) Prior Publication Data

US 2003/0011177 A1 Jan. 16, 2003

(30) Foreign Application Priority Data

Jul. 11, 2001 (JP) ........................................ 2001-210154

(51) Int. Cl.[7] .............................................. B60R 21/22
(52) U.S. Cl. .................................................. 280/730.2
(58) Field of Search ............................ 280/730.2, 734

(56) References Cited

U.S. PATENT DOCUMENTS

| | | | |
|---|---|---|---|
| 5,145,208 A | * | 9/1992 | Hoagland et al. ........... 280/734 |
| 5,564,736 A | * | 10/1996 | Kim ........................ 280/730.2 |
| 5,707,076 A | * | 1/1998 | Takahashi .................... 280/735 |
| 6,113,137 A | * | 9/2000 | Mizutani et al. ............ 280/735 |
| 6,199,900 B1 | * | 3/2001 | Zeigler ........................ 280/735 |
| 6,209,908 B1 | * | 4/2001 | Zumpano .................... 280/729 |
| 6,256,565 B1 | * | 7/2001 | Yanagi et al. .................. 701/45 |
| 6,341,252 B1 | * | 1/2002 | Foo et al. ...................... 701/45 |
| 6,343,810 B1 | * | 2/2002 | Breed ....................... 280/730.2 |
| 6,507,779 B2 | * | 1/2003 | Breed et al. .................. 701/45 |
| 6,529,810 B2 | * | 3/2003 | Foo et al. ...................... 701/45 |
| 6,553,295 B1 | * | 4/2003 | Bauch et al. .................. 701/45 |
| 6,615,122 B1 | * | 9/2003 | Yamashita .................... 701/45 |

FOREIGN PATENT DOCUMENTS

| | | | | |
|---|---|---|---|---|
| EP | 568901 A2 | * | 11/1993 | .......... B60R/21/32 |
| JP | 09240417 A | * | 9/1997 | .......... B60R/21/32 |
| JP | 10035377 A | * | 2/1998 | .......... B60R/19/48 |
| JP | 411034787 A | * | 2/1999 | .......... B60R/21/22 |
| JP | 2001138856 A | * | 5/2001 | .......... B60R/21/32 |

* cited by examiner

*Primary Examiner*—Son T. Nguyen
(74) *Attorney, Agent, or Firm*—Carrier, Blackman & Associates, P.C.; Joseph P. Carrier; William D. Blackman

(57) ABSTRACT

An airbag system includes an airbag arrangement being expanded at a side of a vehicle compartment by igniting an inflator based on a signal from a collision-detecting sensor arrangement in the event of a collision of the vehicle, wherein the airbag arrangement includes a front seat-protecting airbag and a rear seat-protecting airbag, the collision-detecting sensor arrangement includes at least a front seat-detecting sensor for detecting a side impact occurring near a front seat and a rear seat-detecting sensor for detecting a side impact occurring near a rear seat, and the front seat-protecting airbag is expanded when the front seat-detecting sensor detects a side impact, the rear seat-protecting airbag is expanded when the rear seat-detecting sensor detects a side impact.

24 Claims, 5 Drawing Sheets

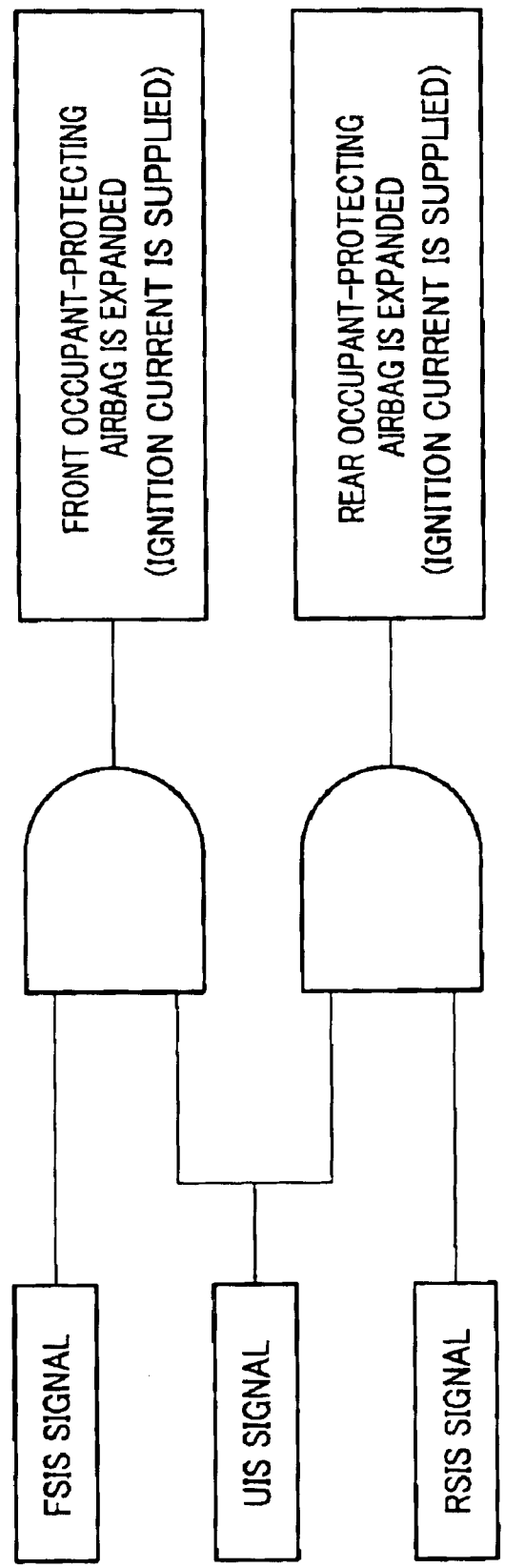

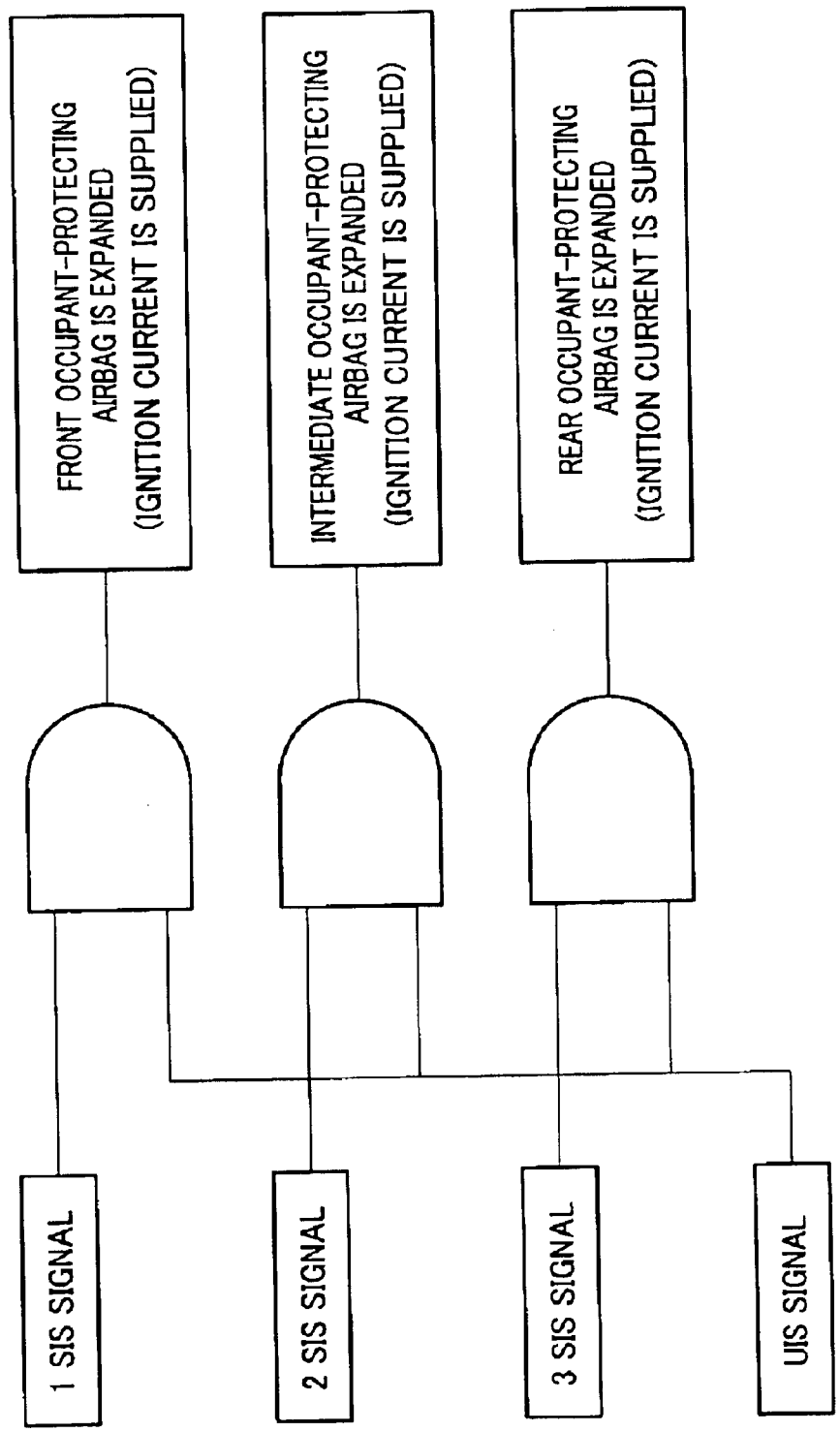

AIRBAG SYSTEM

BACKGROUND OF THE INVENTION

1. Field of the Invention

The present invention relates to an airbag system to protect vehicle occupants in the event of a side impact and the like.

2. Description of Relevant Art

A head-protecting system has been known as an airbag system to protect vehicle occupants in the event of a side impact, a rolling over, and the like. This type of airbag system expands the airbag from a roof side rail portion for covering a side window to protect a head of occupant. The head-protecting system expands the airbag downwardly along a side door so as to cover a small space between an occupant and a side door. Accordingly, the head-protecting system has to expand the airbag faster than the front impact-airbag system, which expands the airbag into a large space such as between an occupant and the steering wheel, or between an occupant and the dashboard. Furthermore, the head-protecting system has to expand the airbag into a large area to protect front and rear occupants.

Accordingly, in this head-protecting system, the airbag is arranged in the vehicle extending from a front pillar to a rear pillar via the roof.

The head-protecting system detects a side impact of the vehicle by the combination of an acceleration sensor and a side acceleration sensor. Herein, the acceleration sensor is placed in an ECU (Electric Control Unit) provided on a front side of a floor, and the side acceleration sensor is provided around a front occupant seat at a side of the vehicle. When these two acceleration sensors detect a side impact, the head-protecting system expands the airbag into the space ranging from a front occupant side to a rear occupant side at a side of a vehicle compartment.

However, when a side impact occurs at a rear occupant side, the side impact will be detected with a little delay, or the impact caused by collision will not be detected and the impact is mitigated, since the acceleration sensor is not near to an area where the vehicle receives the side impact.

Accordingly, there are possibilities such that the head-protecting system can not expand the air bag within an appropriate time, or the head-protecting system can not expand the airbag completely.

Moreover, there are the following drawbacks. When the side impact occurs at a rear occupant side, the airbag dose not have to expand to protect a front occupant due to the fact that the impact caused by collision is mitigated since a front occupant seat is not near to an area where the vehicle receives the side impact. Similarly, When the side impact occurs at a front occupant side, the airbag dose not have to expand to protect the rear occupant due to the fact that the impact caused by the collision is mitigated since a rear occupant seat is not near to the area where the vehicle receives the side impact.

However, the aforementioned head-protecting system expands the airbag from the front occupant seat to the rear occupant seat. This means that the airbag is expanded into also unnecessary space. Additionally, when gas is supplied by one inflator into the airbag for being expanded into over such large space, too much time is required to introduce gas into the airbag for filling completely, at the same time, the inflator needs to be large size too.

Therefore, the object of the present invention is to provide the airbag system capable of expanding the airbag into a required area in appropriate timing in the event of the side impact and the like.

SUMMARY OF THE INVENTION

According to a first aspect of the invention, there is provided an airbag system which solves an aforementioned problem comprised by the airbag accommodated in a side of the vehicle body, the inflator for supplying gas to an aforementioned airbag, and the collision-detecting sensor for detecting a collision of a vehicle. Then, the airbag is expanded at a side of the vehicle compartment by igniting the inflator based on a signal from the collision-detecting sensor in the event of the collision of the vehicle.

Herein, said airbag accommodated in a side of the vehicle body includes a front seat-protecting airbag and a rear seat-protecting airbag. Additionally, said collision-detecting sensor includes at least a front seat-detecting sensor for detecting a side impact occurring near a front seat, and a rear seat-detecting sensor for detecting a side impact occurring near a rear seat. Then, the airbag system expands the airbag in the following manner. When the side impact is detected by said front seat-detecting sensor, said front seat-protecting airbag is expanded. On the other hand, when the side impact is detected by said rear seat-detecting sensor, said rear seat-protecting airbag is expanded.

Consequently, the following effects can be gained in the aforementioned airbag system. When the side impact occurs at a front occupant side, the side impact is rapidly and accurately detected by the front seat-detecting sensor for expanding the front seat-protecting airbag in an appropriate timing. On the other hand, When the side impact occurs at a rear occupant side, the side impact is rapidly and accurately detected by the rear seat-detecting sensor for expanding the rear seat-protecting airbag in an appropriate timing. What is more, when the side impact is detected by both the front seat-detecting sensor and the rear seat-detecting sensor, the front seat-protecting airbag and the rear seat-protecting airbag are expanded simultaneously.

According to a second aspect of the invention, there is provided airbag system which solves an aforementioned problem comprised by the airbag accommodated in a side of the vehicle body, the inflator for supplying gas to an aforementioned airbag, and the collision-detecting sensor for detecting a collision of the vehicle. Then, the airbag is expanded at a side of the vehicle compartment by igniting the inflator based on a signal from the collision-detecting sensor in the event of a collision of the vehicle.

Herein, said airbag accommodated in a side of the vehicle body includes a front seat-protecting airbag, a middle seat-protecting airbag, and a rear seat-protecting airbag. Additionally, said collision-detecting sensor includes at least a front seat-detecting sensor for detecting a side impact occurring near a front seat, a middle seat-detecting sensor for detecting a side impact occurring near a middle seat, and a rear seat-detecting sensor for detecting a side impact occurring near a rear seat. Then, the airbag system expands the airbag in the following manner. When the side impact is detected by said front seat-detecting sensor, said front seat-protecting airbag is expanded. When the side impact is detected by said middle seat-detecting sensor, said middle seat-protecting airbag is expanded. Furthermore, when the side impact is detected by said rear seat-detecting sensor, said rear seat-protecting airbag is expanded.

Consequently, following effects can be gained in the aforementioned airbag system. When the side impact occurs at a front occupant side, the side impact is rapidly and accurately detected by the front seat-detecting sensor for expanding the front seat-protecting airbag in an appropriate timing. When the side impact occurs at a middle occupant side, the side impact is rapidly and accurately detected by the middle seat-detecting sensor for expanding the middle seat-protecting airbag in an appropriate timing. When the side impact occurs at a rear occupant side, the side impact is rapidly and accurately detected by the rear seat-detecting sensor for expanding the rear seat-protecting airbag in an appropriate timing. What is more, when the side impact is detected by the front seat-detecting sensor, the middle seat-detecting sensor, and the rear seat-detecting sensor, all of the front seat-protecting airbag, the middle seat-protecting airbag, and the rear seat-protecting airbag are expanded simultaneously.

BRIEF DESCRIPTION OF THE DRAWINGS

FIG. 2 is a logic diagram showing the relation between a sensor signal and the expansion of an airbag in the front head-protecting system and the rear head-protecting system according to the first embodiment.

FIG. 3A shows a lateral collision against a pole at the front seat. FIG. 3B shows a side impact with MDB at the front seat. FIG. 3C shows a lateral collision against a pole at the rear seat. FIG. 3D shows a side impact with MDB at the rear seat.

FIG. 5 is a logic diagram showing the relation between a sensor signal and the expansion of an airbag in the front head-protecting system, the middle head-protecting system, and the rear head-protecting system according to a second embodiment.

DESCRIPTION OF THE PREFERRED EMBODIMENTS

Figure 1:
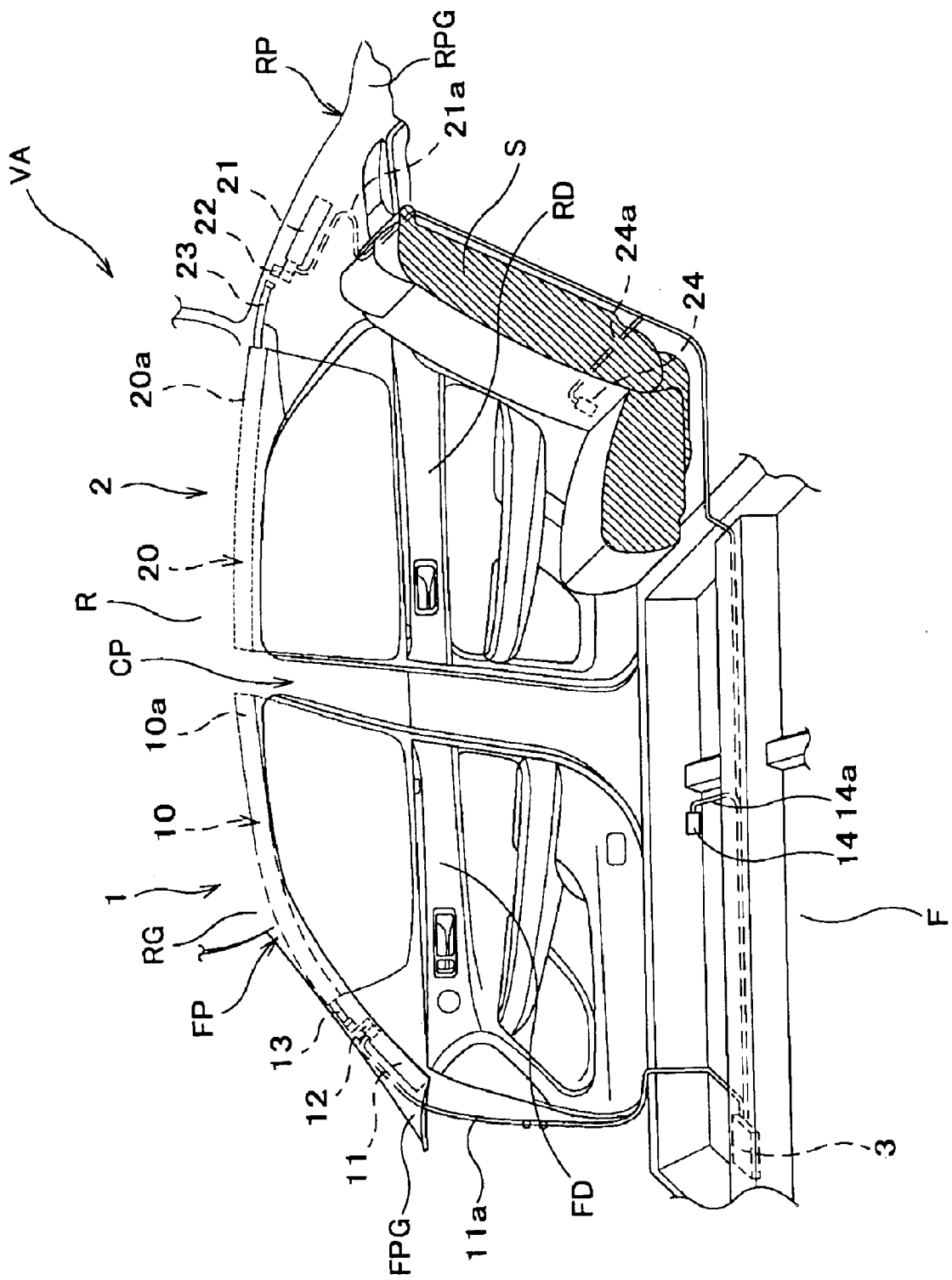
FIG. 1 is a perspective view of a vehicle compartment, wherein the front head-protecting system and the rear head-protecting system of a first embodiment of the invention have been applied to the vehicle compartment.

Embodiments of an airbag system according to the present invention will be described with reference to the attached drawings.

The airbag system is comprised such that a side impact is individually detected by sensors in a front occupant side and a rear occupant side, respectively, for expanding an airbag. Accordingly, a side impact-detecting sensor and a side airbag are separately provided in both the front occupant side and the rear occupant side respectively.

Consequently, even though the side impact occurs at any place(s) along the longitudinal length of the vehicle, the airbag system can expand the airbag only for a required area in an appropriate timing by detecting the side impact within an instantaneous term.

Furthermore, the airbag system is comprised such that the side impact is individually detected by the sensors in the front occupant side, the middle occupant side, and the rear occupant side, respectively for expanding the airbag relative to the three row seats of the vehicle. Accordingly, the side impact-detecting sensors and the side airbags are separately provided in each of the front occupant side, the middle occupant side, and the rear occupant side, respectively.

In the first embodiment, the airbag system according to the first aspect of the invention comprises two head-protecting systems. In the event of a side impact, these two head-protecting systems protect heads of occupants in a sedan type-vehicle having a front occupant seat and a rear occupant seat. One is a head-protecting system for the front occupant (hereinafter referred to as a front head-protecting system). The other one is a head-protecting system for the rear occupant (hereinafter referred to as a rear head-protecting system). These two head-protecting airbag systems are controlled by one ECU. A sensor placed in the ECU is used for these two head-protecting airbag systems in common. Additionally, the front head-protecting system has a front seat-protecting airbag, an inflator, a front seat-side impact sensor, and the like to be used for the front seat. On the other hand, the rear head-protecting system has a rear seat-protecting airbag, the inflator, a rear seat-side impact sensor, and the like to be used for the rear seat.

Sequentially, in the second embodiment, the airbag system according to the second aspect of the invention comprises three head-protecting airbag systems. In the event of a side impact, these three head-protecting systems protect heads of occupants in RV type-vehicle having three row seats in the longitudinal direction of the vehicle. A first one is the head-protecting system for a front occupant (hereinafter referred to as a front head-protecting system). A second one is the head-protecting system for a middle occupant (hereinafter referred to as a middle head-protecting system). Finally a third one is a head-protecting system for a rear occupant (hereinafter referred to as a rear head-protecting system). These three head-protecting systems are controlled by one ECU. A sensor in the ECU is used for these three head-protecting systems in common. Additionally, the front head-protecting system has the front seat-protecting airbag, the inflator, the front seat-side impact sensor, and the like to be used for the front seat. The middle head-protecting system has a middle seat-protecting airbag, the inflator, a middle seat-side impact sensor, and the like to be used for a middle seat. And the rear head-protecting system has a rear seat-protecting airbag, the inflator, a rear seat-side impact sensor, and the like to be used for the rear seat.

Now, the first embodiment of the present invention will be described. A constitution of the front head-protecting system 1 and the rear head-protecting system 2 will be explained with reference to FIG. 1. FIG. 1 is a perspective view showing a vehicle compartment wherein the front head-protecting system and the rear head-protecting system have been applied to the vehicle compartment.

A vehicle VA is constituted in following manner. Seats S are provided in a vehicle framework wherein a floor F and a roof R are linked by a front pillar FP of a front side, a center pillar CP around an center area, and a rear pillar PR of a rear side. The front head-protecting system 1 is accommodated in the vehicle VA extending from the front pillar FP to around the center pillar CP via the roof R. On the other hand, the rear head-protecting system 2 is accommodated in the vehicle VA extending from the rear pillar RP to around the center pillar CP via the roof R. Herein, FIG. 1 only shows the front head-protecting system 1 and the rear head-protecting system 2 of the driver side. However, these systems 1 and 2 are also provided in the passenger side.

In the first embodiment of the present invention, the front head-protecting system 1 and the rear head-protecting system 2 correspond to the airbag system according to the first aspect of the invention.

Herein, the front head-protecting system 1 and the rear head-protecting system 2 are controlled by ECU 3 provided in a front side on a floor F. Additionally, the ECU 3 also controls other type of airbag systems such as a front impact airbag system and the like provided in the vehicle VA.

Firstly, the front head-protecting system 1 will be now explained. In the event of a side impact, the front head-protecting system 1 expands a front seat-protecting airbag 10 into the space ranging from the front pillar FP to around the center pillar CP to protect the occupant. Therefore, the front head-protecting system 1 mainly includes the front seat-protecting airbag 10, an inflator 11, an adapter 12, a pipe 13, a front seat-side impact sensor 14, ECU 3, and a sensor (not shown) placed in ECU 3. Herein, the ECU 3 and a sensor in the ECU 3 will be described after the rear seat-head protecting system 2 is described. Still more, in the first embodiment of the present invention, a front seat-side impact sensor 14 corresponds to a front seat-detecting sensor described in the first aspect of the invention.

The front seat-protecting airbag 10 is accommodated in its folded state within a longitudinal cover 10a. The cover 10a is fixed at the front pillar FP and the roof R by clamps (not shown) and is covered by the front pillar garnish FPG and the roof garnish RG. Then, the front occupant-protecting airbag 10 is inflated and expanded downwardly along inner face of a front door FD (an area surrounded by one point chain line in FIG. 1) when gas is supplied from the inflator 11.

The inflator 11 may be any one of a gas storage type, detonic type, and well known gas generating means. The inflator 11 is fixed at a front pillar FP by holding-clamps (not shown) and is covered by the front pillar garnish FPG. Additionally, the inflator 11 is connected with the ECU 3 by a harness 11a. Then the inflator 11 is ignited by an ignition current from the ECU 3.

The adapter 12 is attached to gas discharge ports of the inflator 11. One end of the pipe 13 is attached to the adapter 12. On the other hand, the front seat-protecting airbag 10 is attached to the other end of the pipe 13. A flow passage of gas is provided between the front seat-protecting airbag 10 and the inflator 11 through the adapter 12 and the pipe 13. Then, gas discharged from the inflator 11 passes through the pipe 13 via the adapter 12 to be supplied into the front seat protecting airbag 10 by using a directivity of the pipe 13. Consequently, the front seat-protecting airbag 10 is filled with gas completely.

A front seat-side impact sensor 14 is an acceleration sensor wherein an electric contact is closed when the side impact of a vehicle VA exceeds a predetermined level for a side impact. Herein, said predetermined level of the side impact is a predetermined value based on the data of a collision test and the like, which is executed under the condition that a direction of impact and a velocity of impact are varied.

The front seat-side impact sensor 14 is provided below a driver seat (not shown) on the floor F and near a front door FD and near a lower portion of the center pillar CP to detect especially a side impact occurring around front occupant seat with a high sensitivity.

Additionally, the front seat-side impact sensor 14 is connected with the ECU 3 by the harness 14a for transmitting ON signal to the ECU 3 as the front seat-side impact sensor signal (hereinafter referred to as PSIS signal) when the electric contact is closed.

Sequentially, the rear head-protecting system 2 will be now explained. In the event of a side impact, the rear head-protecting system 2 expands a rear seat-protecting airbag 20 into the space ranging from the rear pillar RP to around the center pillar CP to protect the occupant.

Therefore, the rear head-protecting system 2 mainly includes the rear seat-protecting airbag 20, the inflator 21, the adapter 22, the pipe 23, the rear seat-side impact sensor 24, and both the ECU 3 and a sensor (not shown) placed in the ECU 3 being used with the front head-protecting system 1 and the rear head-protecting system 2 in common.

Still more, in the first embodiment, a rear seat-side impact sensor 24 corresponds to a rear impact-detecting sensor according to the first aspect of the invention.

The rear seat-protecting airbag 20 is accommodated in its folded state within a longitudinal cover 20a. The cover 20a is fixed at the rear pillar RP and the roof R by clamps (not shown) and is covered by the rear pillar garnish RPG and the roof garnish RG. Then the rear occupant-protecting airbag 20 is inflated and expanded downwardly along inner face of a rear door RD (an area surrounded by two-point chain line in FIG. 1) when gas is supplied from the inflator 21.

The inflator 21 may be any one of a gas storage type, detonic type, and well known gas generating means. The inflator 21 is fixed at a rear pillar RP by holding-clamps (not shown) and is covered by the rear pillar garnish RPG. Additionally, the inflator 21 is connected with the ECU 3 by a harness 21a. Then the inflator 11 is ignited by an ignition current from the ECU 3.

The adapter 22 is attached to gas discharge ports of the inflator 21. One end of the pipe 23 is attached to the adapter 22. On the other hand, the rear occupant-protecting airbag 20 is attached to the other end of the pipe 23. A flow passage of gas is provided between the rear seat-protecting airbag 20 and the inflator 21 through the adapter 22 and the pipe 23. Then, gas discharged from the inflator 21 passes through the pipe 23 via the adapter 22 to be supplied into the rear seat protecting airbag 20 by using a directivity of the pipe 23. Consequently, the rear seat-protecting airbag 20 is filled with gas completely.

Like the front seat-side impact sensor 14, the rear seat-side impact sensor 24 is an acceleration sensor wherein an electric contact is closed when a side impact of a vehicle VA exceeds a predetermined level for the side impact.

The rear seat-side impact sensor 24 is provided below a rear seat and near a rear door RD and near a lower portion of the rear pillar RP to detect especially a side impact occurred around rear seat with a high sensitivity. Additionally, the rear seat-side impact sensor 24 is connected with the ECU 3 by the harness 24a for transmitting an ON signal to the ECU 3 as the rear seat-side impact sensor signal (hereinafter referred to as RSIS signal) when said electric connection is closed.

Next, the ECU 3 will be described with reference to FIG. 1 and FIG. 2. FIG. 2 is a logic diagram showing a relation between a sensor signal and the expansion of an airbag in the front seat-head protecting system and the rear seat-head protecting system.

The ECU 3 controls the expansion of the front occupant-protecting airbag 10 based on signals from both the front seat-side impact sensor 14 and a sensor on center portion of vehicle. At the same time, the ECU 3 controls the expansion of the rear seat-protecting airbag 20 based on signals from the rear seat-side impact sensor 24 and a sensor on center portion of the vehicle.

Therefore, the ECU 3 includes an input circuit (not shown) for FSIS signal and RSIS signal, a backup power supply (not shown), a self-diagnostic circuit (not shown), a sensor (not shown), an ignition current supplying circuit (not shown) for the inflator 11 and the inflator 21. Furthermore, the ECU 3 includes also each kind of circuit for another type of an airbag.

The backup power supply is provided to expand the airbag in even the case when on-vehicle battery (not shown) is broken by the collision or when an electric wire connected with the ECU 3 is cut. For this reason, the backup power supply has an electric power enough to work the ECU 3 in a predetermined time, and includes a condenser for accumulating an electric power enough to ignite the inflator 11 and 12.

The self-diagnostic circuit is a circuit to diagnosis a working condition of the ECU 3, a continuity and a power supply between the sensor 14 and the inflator 11, and a continuity and a power supply between the sensor 24 and the inflator 21. A warning lamp on an instrument panel (not shown) is turned on when the self-diagnostic circuit detects abnormality.

A sensor is constituted as an acceleration sensor in such a manner that the electric contact is connected when the side impact of the vehicle VA exceeds a predetermined level for the vehicle compartment. Herein, said predetermined level for the vehicle compartment is a determined value based on the data of a collision test and the like, which is executed under the condition that a direction of collision and a velocity of collision are varied. Additionally, the predetermined value for the vehicle compartment is smaller than the value for the side impact of the vehicle. The reason comes from following facts. The sensor is provided on approximately a center portion of the vehicle VA. Accordingly, it takes much time for the side impact caused by the collision to reach to the sensor. At the same time, the side impact is mitigated due to a deformation of vehicle body caused by the collision. Then, when said electric contact is connected, the sensor transmits ON signals to each of two ignition current supplying circuits, respectively, as the sensor signal in the unit (hereinafter referred to as UIS signal.)

These two ignition current supplying circuits are the same type of circuit as with each other for supplying an ignition current to the inflator 11 and the inflator 21 so that the inflator 11 and the inflator 21 are ignited respectively. FSIS signal (RSIS signal) is inputted into each of two ignition current supplying circuits via an input circuit. In the mean time, UIS signal is inputted into each of two ignition current supplying circuits from a sensor.

Herein, as shown in FIG. 2, when FSIS signal and UIS signal are ON, one of these two ignition electric supplying circuits supplies an ignition current to the inflator 11. Similarly, when RSIS signal and UIS signal are ON, the other ignition electric supplying circuit supplies ignition current to the inflator 21.

However, when FSIS signal or UIS signal is OFF, said ignition electric supplying circuit does not supply ignition current to the inflator 11. Similarly, when RSIS signal or UIS signal is OFF, said ignition electric supplying circuit does not supply ignition current to the inflator 21.

Accordingly, judgment on the matter whether the airbag is expanded or not, is made based on the signals from two sensors in aforementioned manner. This comes from the fact that any factors such as strength, direction, and classification of the side impact collision can be precisely identified.

Figure 3A:
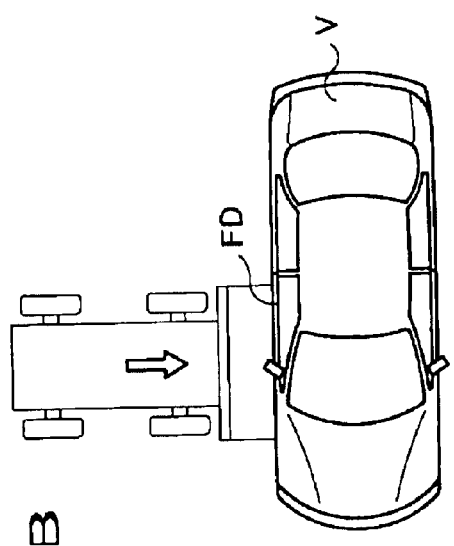
FIG. 3A to 3D are top views illustrating examples with regard to a mode of side impact. Of these.
Figure 3B:
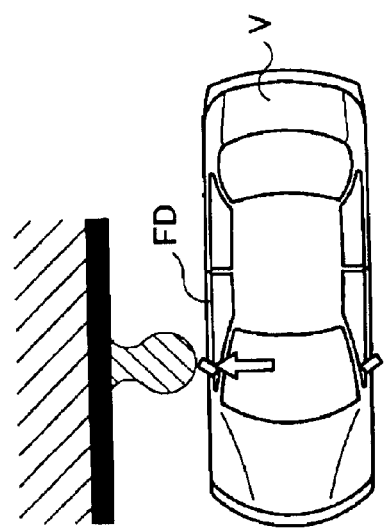
Figure 3C:
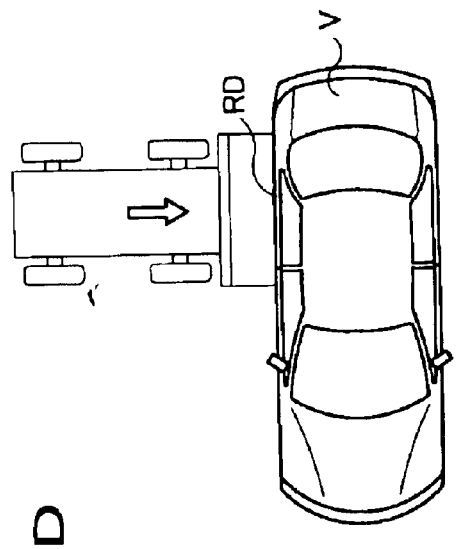
Figure 3D:
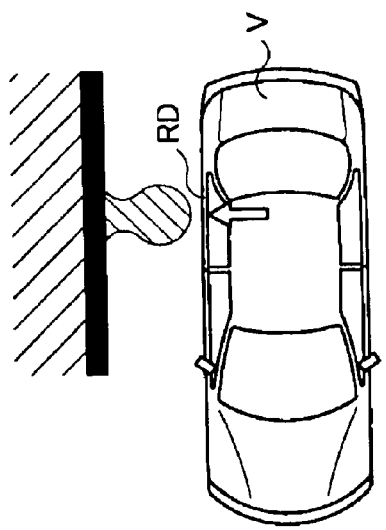

Now, a working process of the front head-protecting system 1 and the rear head-protecting system 2 will be described with reference to FIG. 1, FIG. 2, and FIG. 3. Herein, an explanation is made for the both cases of when the side impact of vehicle VA occurs at the front occupant side and when the side impact occurs at the rear occupant side. FIG. 3A to 3D are top views illustrating examples with regard to a mode of the side impact. Of these, FIG. 3A shows a lateral collision against a pole at the front seat. FIG. 3B shows a side impact with an MDB at the front seat. FIG. 3C shows a lateral collision against a pole at the rear seat. FIG. 3D shows a side impact with an MDB at the rear seat.

Firstly, a case is explained such that the side impact of the vehicle VA occurs at the front occupant side. For example, when the front occupant side of the vehicle body VA crashed into to a pole (FIG. 3A), or when an MDB (Moving Deformable Barrier) crashed into the front occupant side of vehicle body (FIG. 3B), the vehicle VA receives a heavy impact around a front door.

After the vehicle VA receives a heavy impact, a front seat-side impact sensor 14 of the front head-protecting system 1 detects the impact. In the mean time, when a magnitude of the impact exceeds a predetermined level for the impact, said front seat-side impact sensor 14 transmits ON signal to the ECU 3 as FSIS signal. Then, after the ECU 3 received FSIS signal, the ECU 3 transmits FSIS signal to the ignition current supplying circuit (for the inflator 11) via an input circuit. Additionally, the impact is transmitted to the compartment of the vehicle VA with being mitigated by a deformation and the like of vehicle body. In this moment, a sensor in the ECU 3 detects the impact. In the mean time, when the magnitude of the impact exceeds a predetermined level for the vehicle compartment, the sensor in the ECU 3 transmits an On signal to the ignition current supplying circuit in the ECU 3 as UIS signal. Herein, though the impact is also detected in a rear seat-side impact sensor 24, an OFF signal is transmitted to the ECU 3 as RSIS signal under the condition that the magnitude of the impact is less than a predetermined level for the impact since the impact around a rear door RD is minor.

Then, in the ECU 3, the ignition current supplying circuit (for the inflator 11) supplies an ignition current to the inflator 11 based on a signal generated due to the ON signal of FSIS and the ON signal of UIS. In this moment, in the front head-protecting system 1, the inflator 11 is ignited to generate gas that is supplied to the front seat-protecting airbag 10 via the adapter 12 and the pipe 13. After that, in the front head-protecting system 1, the front seat-protecting airbag 10 begins to inflate itself for expanding downwardly along the front door FD. The expanded front seat-protecting airbag 10 (the area surrounded by, one point chain line in FIG. 1) covers almost all the area of a window of the front door FD to protect a head of a front occupant.

Still more, in the ECU 3, the ignition current supplying circuit (for the inflator 21) does not supply an ignition current to the inflator 21 based on the OFF signal of RSIS and the ON signal of UIS. Accordingly, in the rear head-protecting system 2, the rear seat-protecting airbag 20 is not inflated for expanding. However, when the rear seat-side impact sensor 24 detected the magnitude of the impact beyond a predetermined level for the impact, the rear seat-protecting airbag 20 is inevitably inflated and expanded in the rear head-protecting system 2 also.

Next, a case is explained such that a side impact of the vehicle VA occurs at a rear occupant side. For example, when a rear occupant side of the vehicle VA crashed into a pole (FIG. 3C) or when an MDB crashed into a rear occupant side of vehicle body (FIG. 3D), the vehicle VA receives a heavy impact around a rear door.

After the vehicle VA receives a heavy impact, a rear seat-side impact sensor 24 of the rear seat-head protecting system 2 detects the impact. In the mean time, when a magnitude of the impact exceeds a predetermined level for the impact, the rear seat-side impact sensor 24 transmits ON signal to the ECU 3 as RSIS signal. Then, after the ECU 3 receives RSIS signal, the ECU 3 transmits RSIS signal to the ignition current supplying circuit (for the inflator 21) via an input circuit. Additionally, the impact is transmitted to the compartment of the vehicle VA with being mitigated by a deformation and the like of the vehicle body. In this moment, a sensor in the ECU 3 detects the impact. In the mean time, when the magnitude of impact exceeds a predetermined level for the vehicle compartment, the sensor in the ECU 3 transmits an On signal to the ignition current supplying circuit in the ECU 3 as UIS signal. Herein, though the impact is detected in also a front seat-side impact sensor 14, an OFF signal is transmitted to the ECU 3 as FSIS signal under the condition that the magnitude of the impact is less than a predetermined level for the impact since the impact around a front door PD is minor.

Then, in the ECU 3, the ignition current supplying circuit (for the inflator 21) supplies the ignition current to the inflator 21 based on the signal generated due to the ON signal of FSIS and the ON signal of UIS. In this moment, in the rear head-protecting system 2, the inflator 21 is ignited to generate gas that is supplied to the rear seat-protecting airbag 20 via the adapter 22 and the pipe 23. After that, in the rear head-protecting system 2, the rear seat-protecting airbag 20 begins to inflate itself for expanding downwardly along the rear door RD. The expanded rear seat-protecting airbag 20 (the area surrounded by two point chain line in FIG. 1) covers almost all the area of a window of the rear door RD to protect a head of a rear occupant.

Still more, in ECU 3, the ignition current supplying circuit (for the inflator 11) does not supply an ignition current to the inflator 11 based on the OFF signal of FSIS and the ON signal of UIS. Accordingly, in the front head-protecting system 2, the front seat-protecting airbag 10 is not inflated for expanding. However, when the front seat-side impact sensor 14 detects the magnitude of the impact beyond a predetermined level for the impact, the front seat-protecting airbag 10 is inevitably inflated and expanded in the front head-protecting system 1 also.

In the front head-protecting system 1 and the rear head-protecting system 2, a side impact caused by collision and the like can be rapidly and accurately detected by the front seat-side impact sensor 14 or/and the rear seat-side impact sensor 24 provided around the place where the vehicle received the side impact. Accordingly, the front head-protecting system 1 and the rear head-protecting system 2 can inflate and expand the front seat-protecting airbag 10 or/and the rear seat-protecting airbag 20 in appropriate timing.

Furthermore, in the front head-protecting system 1 and the rear head-protecting system 2, the front seat-protecting airbag 10 for protecting a front seat and the rear seat-protecting airbag 20 for protecting a rear occupant are separately provided. In the meantime, the front seat-side impact sensor 14 for detecting the impact of a front seat side and the rear seat-side impact sensor 24 for detecting an impact of a rear seat side are separately provided. Accordingly, the front occupant and the rear occupant can be independently protected in the event of a side impact and the like. Consequently, the front head-protecting system 1 and the rear head-protecting system 2 can inflate and expand the front occupant-protecting airbag 10 or/and the rear occupant-protecting airbag 20 only for an occupant who requires a protection.

What is more, gas is supplied to the front seat-protecting airbag 10 and the rear seat-protecting airbag 20 having a smaller volume than that of a conventional head-protecting airbag system. Consequently, both inflators 11 and 21 can be miniaturized, at the same time, time to supply gas can be shortened.

Figure 4:
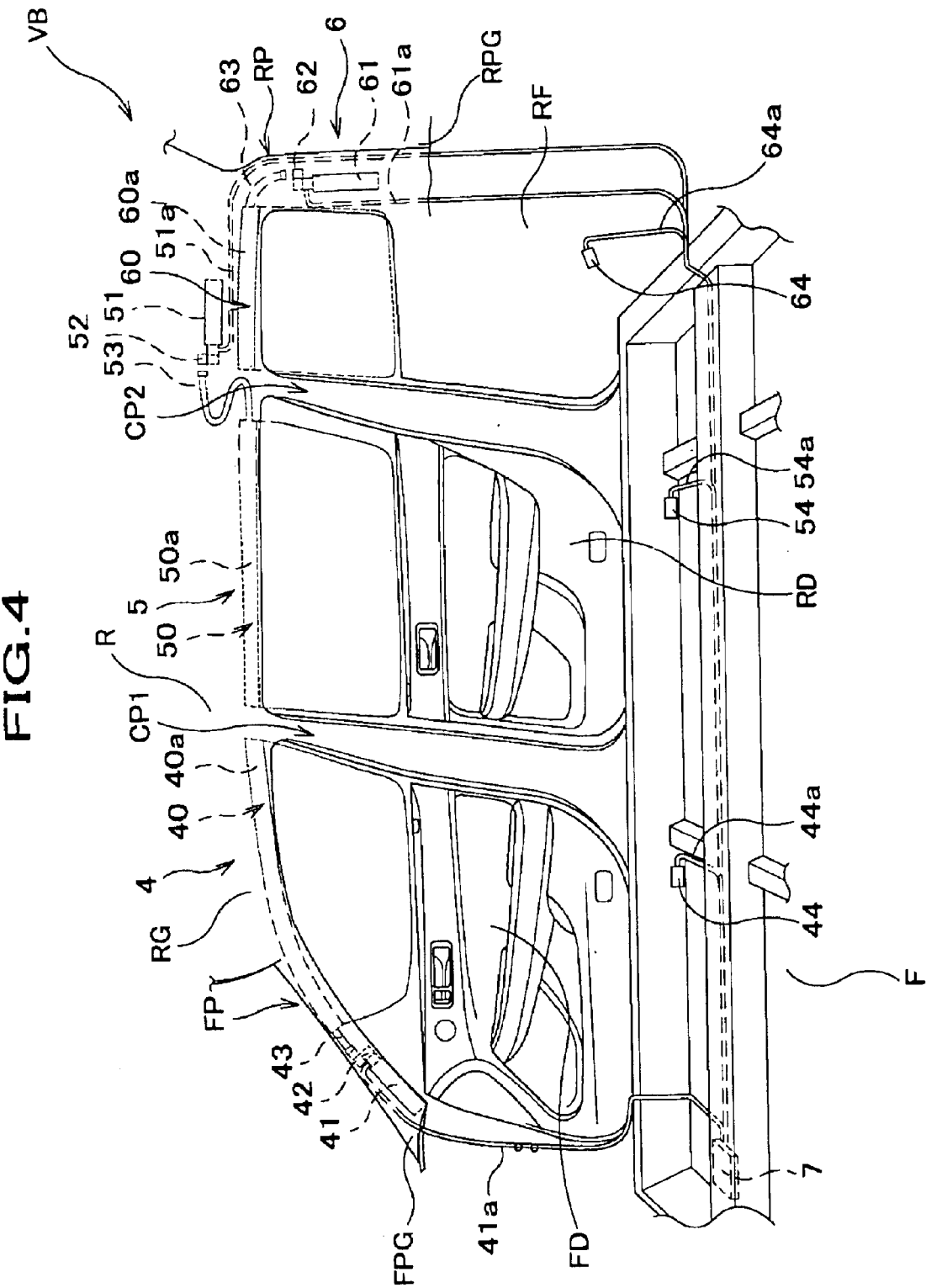
FIG. 4 is a perspective view of the vehicle compartment, wherein the front head-protecting system, the middle head-protecting system, and the rear head-protecting system of the second embodiment have been applied to the vehicle compartment.

Sequentially, the second embodiment of the present invention will be described. A constitution of the front head-protecting system 4, the middle head-protecting system 5 and the rear head-protecting system 6 will be explained with reference to FIG. 4. FIG. 4 is a perspective view showing a vehicle compartment wherein the front head-protecting system, the middle head-protecting system, and the rear head-protecting system have been applied to the vehicle compartment.

A vehicle VB is constituted in following manners. Three row seats (not sown) provided in a vehicle framework wherein a floor F and a roof R are linked by a front pillar FP of a front side, a first center pillar CP 1 between a front door FD and a rear door RD, a second center pillar CP 2 in a rear side of a rear door RD, and a rear pillar PR in an end of a rear side. The front head-protecting system 4 is accommodated in the vehicle VA extending from the front pillar FP to around the first center pillar CP 1 via the roof R. The middle head-protecting airbag system 5 is accommodated in the vehicle VA extending from around the first center pillar CP 1 to around the second center pillar CP 2 via the roof R. The rear head-protecting system 6 is accommodated in the vehicle VB extending from the rear pillar FP to around the second center pillar CP 2 via the roof R.

Herein, FIG. 4 only shows the front head-protecting system 4, the middle head-protecting system 5, and the rear head-protecting system 6 of a driver side. However, these systems 4, 5, 6 are also provided in a passenger side.

In the second embodiment of the present invention, the front head-protecting system 4, the middle head-protecting system 5, and the rear head-protecting system 6 correspond to the airbag system according to the second aspect of the invention.

Herein, the front head-protecting system 4, the middle head-protecting system 5, and the rear head-protecting system 6 are controlled by ECU 7 provided in a front side on a floor F. Additionally, the ECU 7 controls also other types of airbag systems such as a front impact airbag system and the like provided in a vehicle VB.

Firstly, the front head-protecting system 4 will be now explained. In the event of a side impact, the front head-protecting system 4 expands a front seat-protecting airbag 40 into the space ranging from the front pillar FP to around the first center pillar CP 1 to protect the occupant. Therefore, the front head-protecting system 4 mainly includes the front seat-protecting airbag system 40, an inflator 41, an adapter 42, a pipe 43, a front seat-side impact sensor 44, and both the ECU 7 and a sensor (not shown) placed in the ECU 7 also being used with the middle head-protecting system 5 and the rear head-protecting system 6 in common.

Herein, the front head-protecting system 4 has the same constitution as that of the front head-protecting system 1 of the first embodiment. The only difference of each constitutional element between the front head-protecting system 4 and the front head-protecting system 1 is a configuration, an attachment, and the like. Therefore, only the configuration, the attachment and the like are described as each constitutional element. Still more, in the second embodiment of the present invention, a front seat-side impact sensor 44 corresponds to a front impact-detecting sensor described in the second aspect of the invention.

The front head-protecting airbag 40 is accommodated in its folded state within a longitudinal cover 40a. The cover

40a is fixed at the front pillar FP and the roof R by holding-clamps (not shown) and is covered by the front pillar garnish FPG and the roof garnish RG. Additionally, the inflator 41 is fixed at the front pillar FP by holding-clamps (not shown) and is covered by the front pillar garnish FPG to be connected with the ECU 7 and a harness 4a.

An adapter 42 is attached to gas discharge ports of the inflator 41. One end of a pipe 43 is attached to the adapter 42. On the other hand, the front seat-protecting airbag 40 is attached to the other end of the pipe 43.

The front occupant side-impact sensor 44 is provided below a driver seat (not shown) on the floor F and near a font door FD and near a lower portion of the first center pillar CP1 to detect especially a side impact occurring around a front occupant seat with a high sensitivity.

Additionally, the front occupant-side impact sensor 44 is connected with the ECU 7 by the harness 44a for transmitting ON signal to the ECU 7 as a first side impact sensor signal (hereinafter referred to as 1SIS signal) when said electric contact is closed.

Sequentially, the middle head-protecting system 5 will be now explained. In the event of the side impact, the middle head-protecting system 5 expands a middle head-protecting airbag 50 into the space ranging from the first center pillar CP 1 to around the second center pillar CP 2 to protect the occupant. Therefore, the middle head-protecting system 5 mainly includes the middle seat-protecting airbag 50, the inflator 51, the adapter 52, the pipe 53, the middle scat-side impact sensor 54, and both the ECU 7 and a sensor (not shown) placed in the ECU 7 also being used with the front head-protecting system 4 and the rear head-protecting system 6 in common.

Herein, the middle head-protecting system 5 has the same constitution as that of the rear head-protecting system 2 of the first embodiment. The only difference of each constitutional element between the rear head-protecting system 4 and the rear head-protecting system 1 is a configuration, an attachment, and the like. Therefore, only the configuration, the attachment and the like are described as each constitutional element. Still more, in the second embodiment of the present invention, a middle seat-side impact sensor 54 corresponds to a middle impact-detecting sensor according to the second aspect of the invention.

The middle seat-protecting airbag 50 is accommodated in its folded state within a longitudinal cover 50a. The cover 50a is fixed at the roof R by clamps (not shown) and is covered by the roof garnish RG.

The inflator 51 is fixed at the roof R by holding-clamps (not shown) and is covered by the roof garnish RG to be connected with the ECU 7 by a harness 51a.

An adapter 52 is attached to gas discharge ports of the inflator 51. One end of a pipe 53 is attached to the adapter 52. On the other hand, the middle seat-protecting airbag 50 is attached to the other end of the pipe 53.

Then middle seat-side impact sensor 54 is provided below a middle seat (not shown) on a floor F and near the rear door RD FD and near a lower portion of the second center pillar CP2 to detect especially a side impact occurring around a middle seat with a high sensitivity.

Additionally, the middle seat-impact sensor 54 is connected with the ECU 7 by the harness 54a for transmitting ON signal to ECU 7 as a second side impact sensor signal (hereinafter referred to as 2SIS signal) when an electric contact is closed.

Sequentially, the rear head-protecting system 6 will be now explained. In the event of the side impact, the rear head-protecting system 6 expands a rear seat-protecting airbag 60 into the space ranging from the rear pillar RP to around the second center pillar CP 2 to protect an occupant.

Therefore, the rear head-protecting system 6 mainly includes the rear seat-protecting airbag 60, the inflator 61, the adapter 62, the pipe 63, the rear seat-side impact sensor 64, and both the ECU 7 and a sensor (not shown) placed in the ECU 7 also being used with the front head-protecting system 4 and the middle head-protecting system 5 in common.

Herein, the rear head-protecting system 6 has the same constitution as that of the rear head-protecting system 2 of the first embodiment. The only difference of each constitutional element between the rear head-protecting system 6 and the rear head-protecting system 2 is a configuration, an attachment, and the like. Therefore, only the configuration, the attachment and the like are described as each constitutional element. Still more, in the second embodiment of the present invention, a rear occupant-side impact sensor 64 corresponds to a rear seat-side impact-detecting sensor according to the second aspect of the invention.

The rear seat-protecting airbag 60 is accommodated in its folded state within a longitudinal cover 60a. The cover 60a is fixed at the rear pillar RP and the roof R by clamps (not shown) and is covered by the rear pillar roof garnish RPG and the roof garnish RG.

The inflator 61 is fixed at the rear pillar RP by holding-clamps (not shown) and is covered by the rear pillar garnish RPG to be connected with the ECU 7 by a harness 61a.

An adapter 62 is attached to gas discharge ports of the inflator 61. One end of a pipe 63 is attached to the adapter 62. On the other hand, the rear occupant-protecting airbag 60 is attached to the other end of the pipe 63.

The rear seal-side impact sensor 64 is provided below a rear seat (not shown) and an inner side of the rear fender RF FD and near a lower portion of the rear pillar RP to detect especially a side impact occurring around a rear seat with a high sensitivity. Additionally, the rear occupant-side impact sensor 64 is connected with FCU 7 by the harness 64a for transmitting an ON signal to the ECU 7 as a third side impact sensor signal (hereinafter referred to as 3SIS signal) when an electric contact is closed.

Next, the ECU 7 will be described with reference to FIG. 4 and FIG. 5. FIG. 5 is a logic diagram showing a relation between a sensor signal and the expansion of an airbag in the front head-protecting system, the middle head-protecting system, and the rear head-protecting system.

The ECU 7 controls the expansion of a front seat-protecting airbag 40 based on signals from the front seat-side impact sensor 44 and a sensor on a center portion of vehicle. At the same time, the ECU 7 controls the expansion of a middle seat-protecting airbag 50 based on signals from the middle seat-side impact sensor 54 and a sensor on the center portion of vehicle. Furthermore, the ECU 7 controls the expansion of a rear seat-protecting airbag 60 based on signals from the rear occupant-side impact sensor 64 and a sensor on the center portion of vehicle.

Therefore, the ECU 7 includes an input circuit (not shown) for 1SIS signal, 2SIS signal and 3 SIS signal, a backup power supply (not shown), a self-diagnostic circuit (not shown), a sensor (not shown), an ignition current supplying circuit (not shown) for the inflator 41, the inflator 51, and the inflator 61. Furthermore, the ECU 7 includes also any kind of circuit necessary for another type of an airbag. Herein, the backup power supply, the self-diagnosis circuit and the sensor have the same constitution as those of the first embodiment. Accordingly, an explanation is omitted.

These three ignition current supplying circuits are same type of circuit as among with each other for supplying an ignition current to the inflator 41, the inflator 51, and the inflator 61 so that the inflator 41, the inflator 51, and the inflator 6 are ignited respectively. 1SIS signal (2SIS signal, 3SIS signal) is inputted into each of three ignition current supplying circuits via an input circuit. In the mean time, UIS signal is inputted into each of three ignition current supplying circuit from a sensor.

Herein, as shown in FIG. 5, when 1SIS signal and UIS signal are ON, one of these three ignition electric supplying circuits supplies an ignition current to the inflator 41. Similarly, when 2SIS signal and UIS signal are ON, one of other two ignition electric supplying circuits supplies an ignition current to the inflator 51. Furthermore, when 3SIS signal and UIS signal are ON, one except for said two ignition electric supplying circuits supplies ignition current to the inflator 61.

However, when 1SIS signal or UIS signal is OFF, said ignition current supplying circuit does not supply an ignition current to the inflator 41. Similarly, when 2SIS signal or UIS signal is OFF, said ignition current supplying circuit does not supply an ignition current to the inflator 51. Furthermore, when 3SIS signal or UIS signal is OFF, said ignition current supplying circuit does not supply an ignition current to the inflator 61.

Accordingly, judgment on the matter whether the airbag is expanded or not, is made based on the signal from two sensors in aforementioned manner. This comes from the fact that any factors such as strength, direction, and classification of the side impact collision can be precisely identified.

Finally, a working process of the front head-protecting system 4, the intermediate head-protecting system 5, and the rear head-protecting system 6 will be described with reference to FIG. 4 and FIG. 5. Herein, an explanation is made for three cases of when the side impact of vehicle VB occurs at a front occupant side, when a side impact of vehicle VB occurs at a middle occupant side, and when a side impact of vehicle VB occurs at a rear occupant side.

Firstly, a case is explained such that the side impact of the vehicle VB occurs at a front occupant side. For example, when the front occupant side of the vehicle body VB crashed into to a pole, or when an MDB crashed into the front occupant side of vehicle body, the vehicle VB receives a heavy impact around a front door.

After the vehicle VB receives a heavy impact, a front seat-side impact sensor 44 of the front head-protecting system 4 detects the impact. In the mean time, When a magnitude of the impact exceeds a predetermined level for side impact, the front seat-side impact sensor 44 transmits an ON signal to the ECU 7 as 1SIS signal. Then, after the ECU 7 received 1SIS signal, the ECU 7 transmits 1SIS signal to the ignition current supplying circuit (for the inflator 41) via an input circuit. Additionally, the impact is transmitted to the compartment of the vehicle VB with being mitigated by a deformation and the like of vehicle body. In this moment, a sensor in the ECU 7 detects the impact. In the mean time, when the magnitude of side impact exceeds a predetermined level for the vehicle compartment, the sensor in the ECU 7 transmits an On signal to the ignition current supplying circuit in the ECU 7 as UIS signal. Herein, though the impact is also detected in side impact sensors 54 and 64, an OFF signal is transmitted to ECU 7 as 2SIS signal, 3SIS signal under the condition that the magnitude of the impact is less than a predetermined level for the impact since the impact except for around a front door FD is minor.

Then, in the ECU 7, the ignition current supplying circuit (for the inflator 41) supplies ignition current to the inflator 41 based on a signal generated due to the ON signal of 1SIS and the ON signal of UIS. In this moment, in the front head-protecting system 4, the inflator 41 is ignited to generate gas that is supplied to the front seat-protecting airbag 40 via the adapter 42 and the pipe 43. After that, in the front head-protecting system 4, the front seat-protecting airbag 40 begins to inflate itself for expanding downwardly along the front door FD. The expanded front seat-protecting airbag 40 (the area surrounded by one point chain line in FIG. 4) covers almost all the area of a window of the front door FD to protect a head of a front occupant.

Still more, in the ECU 7, the ignition current supplying circuit (for the inflator 51 and the inflator 61) does not supply an ignition current to the inflator 51 and the inflator 61 based on the OFF signals of 2SIS and 3SIS and the ON signal of UIS. Accordingly, in these two head protecting system 5 and 6, the airbags 50 and 60 are not inflated for expanding. However, when two other side impact sensors 54 and 64 have detected the magnitude of the impact beyond a predetermined level for the side impact, the airbags 50 and 60 are inevitably inflated and expanded in these two head-protecting systems 5 and 6 also.

Next, a case is explained such that the side impact of the vehicle VB is in the middle occupant side. For example, when a rear occupant side of the vehicle VB crashed into a pole or when an MDB crashed into a rear occupant side of vehicle body, the vehicle VB receives a heavy impact around a rear door RD.

After the vehicle VB received a heavy impact, a middle seat-side impact sensor 54 of the middle head-protecting system 5 detects the side impact. In the mean time, when a magnitude of the impact exceeds a predetermined level for side impact, the middle occupant-side impact sensor 54 transmits ON signal to the ECU 7 as 2SIS signal. Then, after the ECU 7 received 2SIS signal, the ECU 7 transmits 2SIS signal to the ignition current supplying circuit (for the inflator 51) via an input circuit. Additionally, the side impact is transmitted to the compartment of the vehicle VB with being mitigated by a deformation and the like of vehicle body. In this moment, a sensor in the ECU 7 detects the impact. In the mean time, when the magnitude of side impact exceeds a predetermined level for the vehicle compartment, the sensor in the ECU 7 transmits an On signal to the ignition current supplying circuit of the ECU 7 as UIS signal. Herein, though the side impact is detected in also two other side impact sensors 44 and 64, an OFF signal is transmitted to the ECU 7 as 1SIS signal and 3SIS signal under the condition that the magnitude of the impact is less than a predetermined level for the impact since the impact except for around a rear door RD is minor.

Then, in the ECU 7, the ignition current supplying circuit (for the inflator 51) supplies the ignition current to the inflator 51 based on the signal generated due to the ON signal of 2SIS and the ON signal of UIS. In this moment, in the middle head-protecting system 5, the inflator 51 is ignited to generate gas that is supplied to the middle seat-protecting airbag 50 via the adapter 52 and the pipe 53. After that, in the middle head-protecting system 5, the middle seat-protecting airbag 50 begins to inflate itself for expanding downwardly along the rear door RD. The expanded middle occupant-protecting airbag 50 (the area surrounded by two point chain line in FIG. 4) covers almost all the area of a window of the rear door RD to protect a head of a middle occupant.

Still more, in the ECU 7, the two other ignition current supplying circuits (for the inflator 41 and the inflator 61)

does not supply ignition current to the inflator 41 and the inflator 61 based on both the OFF signals of 1SIS and 3SIS and ON signal of UIS. Accordingly, in these two the head protecting system 4 and 6, the airbags 40, 60 are not inflated for expanding. However, when the two other impact sensors 44 and 64 detect the magnitude of the impact beyond a predetermined level for side impact, these two airbags 40 and 60 are inevitably inflated and expanded in the two head protecting systems 4 and 6 also.

Finally, a case is explained such that the side impact of the vehicle VB is around rear occupant side. For example, when a rear fender RF of the vehicle VB crashed into a pole or when an MDB crashed into a rear fender RF of the vehicle VB, the vehicle VB receives a heavy impact around a rear fender RF.

After the vehicle VB received a heavy impact, a rear seat-side impact sensor 64 of the rear seat-head protecting system 6 detects the impact. In the mean time, when a magnitude of the impact exceeds a predetermined level for the impact, said rear occupant-side impact sensor 64 transmits an ON signal to the ECU 7 as 3SIS signal. Then, after the ECU 7 received 3SIS signal, the ECU 7 transmits 3SIS signal to the ignition current supplying circuit (for the inflator 61) via an input circuit. Additionally, the impact is transmitted to the compartment of the vehicle VB with being mitigated by a deformation and the like of vehicle body. In this moment, a sensor in the ECU 7 detects the impact. In the mean time, when the magnitude of side impact exceeds a predetermined level for the vehicle compartment, the sensor in the ECU 7 transmits an ON signal to the ignition current supplying circuit in the ECU 7 as UIS signal. Herein, though the impact is detected in the two other side impact sensors 44 and 54 also, an OFF signal is transmitted to the ECU 7 as 1SIS signal and as 2SIS signal under the condition that the magnitude of the impact is less than a predetermined level for the impact since the impact except for around a rear fender RF is minor.

Then, in the ECU 7, the ignition current supplying circuit (for the inflator 61) supplies an ignition current to the inflator 61 based on a signal generated due to the ON signal of 3SIS and the ON signal of UIS. In this moment, in the rear head-protecting system 6, the inflator 61 is ignited to generate gas that is supplied to the rear seat-protecting airbag 60 via the adapter 62 and the pipe 63. After that, in the rear head-protecting system 6, the rear seat-protecting airbag 60 begins to inflate itself for expanding downwardly along the rear fender RF. The expanded rear seat-protecting airbag 60 (the area surrounded by two point chain line in FIG. 4) covers almost all the area of a window of the rear fender RF to protect a head of a rear occupant.

Still more, in the ECU 7, two other ignition current supplying circuits (for the inflator 41 and the inflator 51) do not supply the ignition current to the inflator 41 and the inflator 51 based on the OFF signals of 1SIS and 2SIS and the ON signal of UIS. Accordingly, in the front and middle occupant-head protecting systems 4 and 5, the airbags 40 and 50 are not inflated for expanding. However, when two other side impact sensors 44 and 54 detect the magnitude of the impact beyond a predetermined level for side impact, the airbags 40 and 50 are inevitably inflated and expanded in these two front seat-head protecting systems 4 and 5 also.

In the front head-protecting system 4, the middle head-protecting system 5, and the rear head-protecting system 6, the side impact caused by collision and the like can be rapidly and accurately detected by the front seat-side impact sensor 14 or the middle seat-side impact sensor 54 or/and the rear seat-side impact sensor 64 provided around the place where the vehicle received the side impact. Accordingly, the front head-protecting system 4, the middle head-protecting system 5, and the rear head-protecting system 6 can inflate and expand the front seat-protecting airbag 40, the intermediate seat-protecting airbag 50 or/and the rear seat-protecting airbag 60 in appropriate timing.

Furthermore, in the front head-protecting system 4, the middle head-protecting system 5, and the rear head-protecting system 6, the front seat-protecting airbag 40 for protecting a front seat occupant, the middle seat-protecting airbag 50 for protecting a middle seat occupant, and the rear seat-protecting airbag 60 for protecting a rear seat occupant are separately provided. In the meantime, the front seat-side impact sensor 44 for detecting the impact of a front seat side, the middle seat-side impact sensor 54 for detecting the impact of a middle seat side, and the rear seat-side impact sensor 64 for detecting the impact of a rear seat side are separately provided. Accordingly, the front occupant, the intermediate occupant, and the rear occupant can be independently protected in the event of the side impact and the like. Consequently, the front head-protecting system 4, the middle head-protecting system 5 and the rear head-protecting system 6 can inflate and expand the front seat-protecting airbag 40, the middle seat-protecting airbag 50 or/and the rear seat-protecting airbag 60 only for occupant(s) who require protection.

What is more, gas is supplied to the airbags 40, 50, and 60 having a smaller volume than that of a conventional head-protecting airbag system. Consequently, the inflators 41, 51, and 61 can be miniaturized, at the same time, time to supply gas can be shortened.

The embodiment of the present invention has been described in aforementioned style. However, the present invention is not restricted to aforementioned style, but can be practical in various ways.

For example, the air bag system of the present embodiment is comprised in such manner that the airbag is expanded when signals from the side impact sensor and the sensor in ECU are ON signals. Additionally, the airbag system of the present embodiment can also be comprised as following ways. The airbag is expanded in such cases when a signal from any one of said two sensors is an ON signal, when a signal from only a side impact sensor is an ON signal, and when signals from the side impact sensor and the other type of a sensor are ON signals.

Furthermore, the airbag system of the present embodiment is comprised in such manner that the impact sensor for detecting the side impact determines whether the airbag is expanded or not. What is more, the airbag system can also be comprised in following manner. An occupant-detecting sensor is provided in individual seats to detect the presence of an occupant. The airbag is expanded for an occupied seat in only the case such that the presence of an occupant is detected by the occupant-detecting sensor even though the side impact is detected by the impact sensor. For example, all of occupant protecting airbags can not be expanded except for the front seat-protecting airbag in a driver side when the only occupant is the driver. Herein, a seat switch or an infrared sensor can be used as an occupant-detecting sensor.

What is more, the side impact sensor of the second embodiment is comprised in such manner that side impact sensor is individually provided on the front seat, the middle seat, and the rear seat, respectively, in both a driver side and a passenger side of the vehicle. However, the side impact sensor can also be comprised in following manners. Two side impact sensors are provided on two portions respectively. One is provided around the center between a front seat and a middle seat. The other one is provided around a rear seat. When the side impact sensor provided around the center (the sensor being used as the front seat-detecting sensor and the middle seat-detecting sensor in common) detects the side impact, the front seat-protecting airbag and the middle seat-protecting airbag are expanded.

Furthermore, two side impact sensors are provided on two portions respectively. One is provided around the center between a middle occupant seat and a rear occupant seat. The other one is provided around a front occupant seat. When the side impact sensor provided around the center (the sensor being used as the middle occupant-detecting sensor and the rear occupant-detecting sensor in common) detects the side impact, the middle seat-protecting airbag and the rear seat-protecting airbag are expanded.

Although there have been described in detail what are the present embodiments of the invention, it will be understood by persons skilled in the art that variations and modifications may be made thereto without departing from the gist, spirit or essence of the invention as reflected in the appended claims.

What is claimed is:

1. An airbag system comprising:

airbags accommodated in a side of a vehicle body;

inflators for supplying gas to the airbags, respectively;

collision-detecting sensors provided apart from doors of the vehicle body for detecting a side impact of a vehicle;

a sensor provided at a center portion of the vehicle for detecting the side impact transmitted to a compartment of the vehicle; and an Electronic Control Unit (ECU);

the airbags being expanded at a side of a vehicle compartment by selectively igniting the inflators based on two signals of the ECU derived respectively from outputs of the collision-detecting sensors and the sensor at the center portion of the vehicle in the event of a collision of the vehicle, wherein the airbags include a front seat-protecting airbag and a rear seat-protecting airbag, wherein the collision-detecting sensors include at least a front seat-detecting sensor located near a lower portion of a center pillar of the vehicle body for detecting a side impact occurring near a front seat and a rear seat-detecting sensor located near a lower portion of a rear pillar of the vehicle body for detecting a side impact occurring near a rear seat, wherein the sensor at the center portion of the vehicle detects the side impact transmitted to the compartment of the vehicle with being mitigated by a deformation of the vehicle body, and wherein the front seat-protecting airbag is expanded when the front seat-detecting sensor and the sensor at the center portion of the vehicle detect a side impact, and the rear seat-protecting airbag is expanded when the rear seat-detecting sensor and the sensor at the center portion of the vehicle detect a side impact.

2. The airbag system according to claim 1, wherein the ECU includes an input circuit for a font seat-side impact sensor (FSIS) signal and a rear seat-side impact sensor (RSIS) signal, a backup power supply, a self-diagnostic circuit, said sensor at the center portion of the vehicle, and an ignition current supplying circuit for the inflator.

3. A method for expanding an airbag in the airbag system according to claim 1, comprising the stets of:

transmitting ON signal from the front seat-detecting sensor to the ECU as a front seat-side impact sensor (FSIS) signal and transmitting ON signal from the sensor at the center portion of the vehicle to the ECU as a unit sensor (UIS) signal when a side impact of the vehicle occurs at a front occupant side, and expanding the front occupant-protecting airbag when the ECU simultaneously receives both said FSIS and said UIS signals.

4. A method for expanding an airbag in the airbag system according to claim 3, further comprising the steps of:

transmitting ON signal from the rear seat-detecting sensor to the ECU as a rear seat-side impact sensor (RSIS) signal and transmitting ON signal from the sensor at the center portion of the vehicle to the ECU as the unit sensor (UIS) signal when a side impact of the vehicle occurs at a rear occupant side, and expanding the rear occupant-protecting airbag when the ECU simultaneously receives both said RSIS and said UIS signals.

5. A method for expanding an airbag in the airbag system according to claim 4, wherein the front occupant-protecting airbag is not expanded when any one of the FSIS signal and the UIS signal is OFF, and the rear occupant-protecting airbag is not expanded when any one of the RSIS signal and the UIS signal is OFF.

6. The airbag system according to claim 1, wherein the front seat-detecting sensor is disposed near a front seat for detecting a side impact occurring near the front seat, and the rear seat-detecting sensor is disposed near a rear seat for detecting a side impact occurring near the rear seat.

7. The airbag system according to claim 1, wherein:

the front seat-detecting sensor transmits an ON signal to the ECU as a front seat-side impact sensor (FSIS) signal when said sensor detects a side impact of the vehicle body, the rear seat-detecting sensor transmits an ON signal to the ECU as a rear seat-side impact sensor (RSIS) signal when said sensor detects a side impact of the vehicle body, and the sensor at the center portion of the vehicle transmits ON signal to the ECU as a unit sensor (UIS) signal when said sensor detects a side impact of the vehicle;

the ECU ignites the inflator of the front occupant-protecting airbag when the ECU receives both said FSIS and said UIS signals; and the ECU ignites the inflator of the rear occupant-protecting airbag when the ECU receives both said RSIS and said UIS signals.

8. An airbag system comprising:

airbags accommodated in a side of a vehicle body;

inflators for supplying gas to the airbags, respectively;

collision-detecting sensors provided apart from doors of the vehicle body for detecting a side impact of vehicle;

a sensor provided at a center portion of the vehicle for detecting the side impact transmitted to a compartment of the vehicle; and an Electronic Control Unit (ECU);

the airbag being expanded at a side of a vehicle compartment by selectively igniting the inflators based on two signals of the ECU derived respectively from outputs of the collision-detecting sensors and the sensor at the center portion of the vehicle in the event of a collision of the vehicle, wherein the airbags include a front seat-protecting airbag, a middle seat-protecting airbag, and a rear seat-protecting airbag, wherein the collision-detecting sensors include at least a front seat-detecting sensor located near a lower portion of a center pillar of the vehicle body for detecting a side impact occurring near a front seat, a middle seat-detecting sensor located near a lower portion of another center pillar of the vehicle body for detecting a side impact occurring near a middle seat, and a rear seat-detecting sensor located near a lower portion of a rear pillar of the vehicle body for detecting a side impact occurring near a rear seat, wherein the sensor at the center portion of the vehicle detects the side impact transmitted to the compartment of the vehicle with being mitigated by a deformation of the vehicle body, and wherein the front seat-protecting airbag is expanded when the front seat-detecting sensor and the sensor at the center portion of the vehicle detect a side impact, the middle seat-protecting airbag is expanded when the middle seat-detecting sensor and the sensor at the center portion of the vehicle detect a side impact, and the rear seat-protecting airbag is expanded when the rear seat-detecting sensor and the sensor at the center portion of the vehicle detect a side impact.

9. The airbag system according to claim 8, wherein the ECU includes an input circuit for a first side impact sensor (1SIS) signal, a second side impact sensor (2SIS) signal and a third side impact sensor (3SIS) signal, a backup power supply, a self-diagnostic circuit, said sensor at the center portion of the vehicle, and an ignition current supplying circuit for the inflator.

10. A method for expanding an airbag in the airbag system according to claim 8, comprising the steps or:

transmitting ON signal from the front seat-detecting sensor to the ECU as a first side impact sensor (1SIS) signal and transmitting ON signal from the sensor at the center portion of the vehicle to the ECU as a unit sensor (UIS) signal when a side impact of the vehicle occurs at a front occupant side, and expanding the front occupant-protecting airbag when the ECU simultaneously receives both said 1SIS and said UIS signals.

11. A method for expanding an airbag in the airbag system according to claim 10, further comprising the steps of:

transmitting ON signal from the middle seat detecting sensor to the ECU as a second side impact sensor (2SIS) sigal and transmitting ON signal from the sensor at the center portion of the vehicle to the ECU as the UIS signal when a side impact of the vehicle occurs at a middle occupant side, and expanding the middle occupant-protecting airbag when the ECU simultaneously receives both said 2SIS and said UIS signals.

12. A method for expanding an airbag in the airbag system according to claim 11, further comprising the steps of:

transmitting ON signal from the rear seat-side impact sensor to the ECU as a third side impact sensor (3SIS) signal and the sensor at the center portion of the vehicle transmits ON signal to the ECU as the UIS signal when a side impact of the vehicle occurs at a rear occupant side, and expanding the rear occupant-protecting airbag when the ECU simultaneously receives both said 3SIS and said UIS signals.

13. A method for expanding an airbag in the airbag system according to claim 12, wherein the front occupant-protecting airbag is not expanded when any one of the 1SIS signal and the UIS signal is OFF, the middle occupant-protecting airbag is not expanded when any one of the 2SIS signal and the UIS signal is OFT, and the rear occupant-protecting airbag is not expanded when any one of the 3SIS signal and the UIS signal is OFF.

14. The airbag system according to claim 8, wherein the front seat-detecting sensor is disposed near a front seat for detecting a side impact occurring near the front seat, the middle seat-detecting sensor is disposed near a middle seat for detecting a side impact occurring near the middle seat, and the rear seat-detecting sensor is disposed near a rear seat for detecting a side impact occurring near the rear seat.

15. The airbag system according to claim 8, wherein:

the front seat-detecting sensor transmits an ON signal to the ECU as a first side impact sensor (1SIS) signal when said sensor detects a side impact of the vehicle body, the middle seat-detecting sensor transmits an ON signal to the ECU as a second side impact sensor (2SIS) signal when said sensor detects a side impact of the vehicle body, the rear seat-detecting sensor transmits an ON signal to the ECU as a third seat-side impact sensor (3SIS) signal when said sensor detects a side impact of the vehicle body, and the sensor at the center portion of the vehicle transmits ON signal to the ECU as a unit sensor (UIS) signal when said sensor detects a side impact of the vehicle;

the ECU ignites the inflator for the front seat-protecting airbag when the ECU receives both said 1SIS and said UIS signals;

the ECU ignites the inflator of the middle seat-protecting airbag when the ECU receives both said 2SIS and said UIS signals; and the ECU ignites the inflator of the rear seat-protecting airbag when the ECU receives both said 3SIS and said UIS signals.

16. An airbag system comprising:

an airbag arrangement accommodated in a side of a vehicle body, an inflator arrangement which supplies gas to the airbag arrangement; and a collision-detecting sensor arrangement provided apart from door of the vehicle body, and which detects a side impact of a vehicle;

a sensor provided at a center portion of the vehicle for detecting the side impact transmitted to a compartment of the vehicle; and an Electronic Control Unit (ECU);

the airbag arrangement being expanded at a side of a vehicle compartment by selectively igniting the inflator arrangement based on two signals of the ECU derived respectively from outputs of the collision-detecting sensor and the sensor at the center portion of the vehicle in the event of a collision of the vehicle, the airbag arrangement including multiple airbags spaced from each other in a longitudinal direction of the vehicle;

the inflator arrangement including multiple inflators associated with said airbags, respectively:

the collision-detecting sensor arrangement including multiple sensors spaced from each other in a longitudinal direction of the vehicle, and located near lower portions of side pillars of the vehicle body, respectively; and various ones of said airbags being selectively expanded when corresponding ones of said multiple sensors of the airbag arrangement and the sensor provided at the center portion of the vehicle detect a side impact of the vehicle body.

17. The airbag system according to claim 16, wherein:

said airbag arrangement includes a front seat-protecting airbag and a rear seat-protecting airbag, the collision-detecting sensor arrangement includes at least a front seat-detecting sensor provided near a lower portion of a center pillar of the vehicle body for detecting a side impact occurring near a front seat and a rear seat-detecting sensor provided near a lower portion of a rear pillar of the vehicle body for detecting a side impact occurring near a rear seat, and the front seat-protecting airbag is expanded when the front seat-detecting sensor detects a side impact and the sensor provided at the center portion of the vehicle detects a side impact of the vehicle body, and the rear seat-protecting airbag is expanded when the rear seat-detecting sensor detects a side impact and the sensor provided at the center portion of the vehicle detects a side impact of the vehicle body.

18. The airbag system according to claim 16, wherein:

the airbag arrangement includes a front seat-protecting airbag, a middle seat-protecting airbag, and a rear seat-protecting airbag, the collision-detecting sensor arrangement includes at least a font seat-detecting sensor provided near a lower portion of a center pillar of the vehicle body for detecting a side impact occurring near a front seat a middle seat-detecting sensor provided near a lower portion of another center pillar of the vehicle body for detecting a side impact occurring near a middle seat, and a rear seat-detecting sensor provided near a lower portion of a rear pillar of the vehicle body for detecting a side impact occurring near a rear seat, and the front seat-protecting airbag is expanded when the front seat-detecting sensor detects a side impact and the sensor provided at the center portion of the vehicle detects a side impact of the vehicle body, the middle seat-protecting airbag is expanded when the middle seat-detecting sensor detects a side impact and the sensor provided at the center portion of the vehicle detects a side impact of the vehicle body and the rear seat-protecting airbag is expanded when the rear seat-detecting sensor detects a side impact and the sensor provided at the center portion of the vehicle detects a side impact of the vehicle body.

19. The airbag system according to claim 16, wherein said inflator arrangement includes multiple inflators associated with respective ones of said multiple airbags.

20. The airbag system according to claim 16, wherein:

various ones of said airbags are selectively expanded by said inflator arrangement when corresponding ones of said multiple sensors of the collision-detecting sensor arrangement detect a side impact of the vehicle body having at least a predetermined magnitude and the sensor provided at the center portion of the vehicle detects a side impact of the vehicle body having at least a different, smaller predetermined magnitude.

21. The airbag system according to claim 16, wherein said ECU commonly controls operation of the airbag arrangement, the inflator arrangement and the collision-detecting sensor arrangement; and said collision-detecting sensor arrangement including collision-detecting sensors associated with respective longitudinal rows of seats in the vehicle body, and said sensor provided at a center portion of the vehicle is disposed with said ECU.

22. The airbag system according to claim 16, wherein the ECU includes an input circuit for a front seat-side impact sensor (FSIS) signal and a rear seat-side impact sensor (RSIS) signal, a backup power supply, a self-diagnostic circuit, said sensor at the center portion of the vehicle, and an ignition current supplying circuit for the inflator.

23. The airbag system according to claim 16, wherein the sensor provided at the center portion of the vehicle detects the side impact transmitted to the compartment of the vehicle with being mitigated by a deformation of the vehicle body.

24. A controller for expanding an airbag in the airbag system according to claim 16, the controller consisting essentially of said ECU which comprises:

an input circuit for a front seaside impact sensor (FSIS) signal and a rear seat-side impact sensor (RSIS) signal;

a backup power supply;

a self-diagnostic circuit;

said sensor provided at the center portion of the vehicle, and ignition current supplying circuits for the inflators, respectively.

* * * * *

UNITED STATES PATENT AND TRADEMARK OFFICE
CERTIFICATE OF CORRECTION

PATENT NO. : 6,848,710 B2
APPLICATION NO. : 10/192122
DATED : February 1, 2005
INVENTOR(S) : Fumitoshi Yasuhara et al.

It is certified that error appears in the above-identified patent and that said Letters Patent is hereby corrected as shown below:

Title Page:
    Under "(56) References Cited", further under "FOREIGN PATENT DOCUMENTS", change "JP    411034787   A" to --JP   11034787  A--.

Column 1:
    Line 44, change "the air bag within" to --the airbag within--.
    Line 48, change "the airbag dose" to --the airbag does--.
    Line 52, change "Similarly, When" to --Similarly, when--.
    Line 53, change "the airbag dose" to --the airbag does--.
    Line 62, change "expanded into over" to --expanded into--.

Column 2:
    Line 32, change "hand, When" to --hand, when--.
    Line 41, change "provided airbag system" to --provided an airbag system--.

Column 3:
    Line 26, change "FIG. 3A to 3D" to --FIGS. 3A to 3D--.
    Line 29, change "MDB at the front" to --an MDB (Moving Deformable Barrier) at the front--.
    Line 31, change "MDB at the rear" to --an MDB at the rear--.
    Line 54, change "occupant side respectively." to --occupant side, respectively.--.
    Line 63, change "side, respectively for" to --side, respectively, for--.

Column 4:
    Line 5, change "sedan type-vehicle" to --sedan-type vehicle--.
    Line 22, change "in RV type-vehicle" to --in an RV-type vehicle--.
    Line 28, change "Finally a third one" to --Finally, a third one--.
    Line 49, change "in following manner." to --in the following manner.--.
    Line 52, change "around an center area," to --around a center area,--; change "rear pillar PR" to --rear pillar RP--.
    Line 67, change "by ECU 3" to --by an ECU 3--.

Column 5:
    Line 2, change "other type of" to --other type(s) of--.
    Line 12, change "placed in ECU 3." to --placed in the ECU 3.--.
    Line 14, change "seat-head protecting" to --seat head-protecting--.
    Line 23, change "downwardly along inner" to --downwardly along an inner--.
    Line 24, change "by one point" to --by one-point--.
    Line 28, change "and well known" to --and well-known--.
    Line 41, change "the front seat" to --the front seat- --.

UNITED STATES PATENT AND TRADEMARK OFFICE
CERTIFICATE OF CORRECTION

PATENT NO. : 6,848,710 B2
APPLICATION NO. : 10/192122
DATED : February 1, 2005
INVENTOR(S) : Fumitoshi Yasuhara et al.

It is certified that error appears in the above-identified patent and that said Letters Patent is hereby corrected as shown below:

Column 5: (cont'd)
    Line 56, change "occurring around front" to --occurring around a front--.
    Line 61, change "PSIS signal" to --FSIS signal--.

Column 6:
    Line 15, change "along inner face" to --along an inner face--.
    Line 19, change "and well known" to --and well-known--.
    Line 32, change "the rear seat" to --the rear seat- --.
    Line 43, change "occurred around rear" to --occurring around a rear--.
    Line 52, change "front seat-head protecting system and the rear seat-head" to --front seat head-protecting system and the rear seat head- --.
    Lines 56-57, change "on center portion of vehicle." to --on a center portion of the vehicle.--.
    Line 59, change "sensor on center" to --sensor on a center--.

Column 7:
    Line 2, change "when on-vehicle" to --when an on-vehicle--.
    Line 7, change "ignite the inflator" to --ignite the inflators--.
    Line 9, change "diagnosis" to --diagnose--.
    Line 26, change "from following facts." to --from the following facts. -- .
    Line 30, change "of vehicle body" to --of the vehicle body--.
    Line 34, change "UIS signal.)" to --UIS signal).--.
    Line 40, change "In the mean" to --In the mean- --.
    Line 57, change "in aforementioned" to --in the aforementioned--.
    Line 66, change "FIG. 3A to 3D" to --FIGS. 3A to 3D--.

Column 8:
    Line 2, change "MDB" to --MDB (Moving Deformable Barrier)--.
    Line 7, change "body VA crashed" to --body VA crashes--.
    Line 8, change "into to a pole" to --into a pole--; delete "(Moving".
    Line 9, change "Deformable Barrier) crashed" into --crashes--.
    Line 10, change "vehicle body" to --the vehicle body--.
    Line 14, change "In the mean time," to --In the meantime,--.
    Line 18, change "received FSIS" to --receives FSIS--.
    Line 22, change "of vehicle body." to --of the vehicle body.--.
    Line 23, change "In the mean time," to --In the meantime,--.
    Line 26, change "an On signal" to --an ON signal--.
    Line 43, change "by, one point chain line" to --by one-point chain line--.

UNITED STATES PATENT AND TRADEMARK OFFICE
CERTIFICATE OF CORRECTION

PATENT NO. : 6,848,710 B2
APPLICATION NO. : 10/192122
DATED : February 1, 2005
INVENTOR(S) : Fumitoshi Yasuhara et al.

It is certified that error appears in the above-identified patent and that said Letters Patent is hereby corrected as shown below:

Column 8: (cont'd)
    Line 53, change "detected the magnitude" to --detects the magnitude--.
    Line 59, change "VA crashed into" to --VA crashes into--.
    Line 60, change "MDB crashed into" to --MDB crashes into--.
    Line 61, change "side of vehicle" to --side of the vehicle--.
    Line 64, change "seat-head protecting" to --seat head-protecting--.
    Line 65, change "In the mean time," to --In the meantime,--.

Column 9:
    Line 7, change "In the mean time," to --In the meantime,--.
    Line 10, change "an On signal" to --an ON signal--.
    Line 16, change "front door PD" to --front door FD--.
    Line 27, change "two point chain line" to --two-point chain line--.
    Line 30, change "in ECU 3," to --in the ECU 3,--.
    Line 56, change "front seat side" to --front seat-side--.
    Line 58, change "rear seat side" to --rear seat-side--.

Column 10:
    Line 15, change "(not sown)" to --(not shown)--.
    Line 17, change "center pillar CP 1" to --center pillar CP1--.
    Line 18, change "center pillar CP 2" to --center pillar CP2--.
    Line 19, change "rear pillar PR" to --rear pillar RP--.
    Line 22, change "center pillar CP 1" to --center pillar CP1--.
    Line 24, change "center pillar CP" to --center pillar CP1--.
    Line 25, change "1 to around the second center pillar CP 2" to --to around the second center pillar CP2--.
    Line 27, change "rear pillar FP" to --rear pillar RP--.
    Line 28, change "center pillar CP 2" to --center pillar CP2--.
    Line 40, change "by ECU 7" to --by an ECU 7--.
    Line 48, change "center pillar CP 1" to -- center pillar CP1--.

Column 11:
    Line 6, change "harness 4*a*" to --harness 41*a*--.
    Line 12, change "near a font" to --near a front--.
    Line 25, change "CP 1 to around" to --CP1 to around--; change "center pillar CP 2" to --center pillar CP2--.
    Line 28, change "middle scat-side" to --middle seat-side--.
    Line 56, change "Then middle seat-side" to --The middle seat-side--.
    Line 58, change "RD FD" to --RD--.
    Line 63, change "to ECU 7" to --to the ECU 7--.

UNITED STATES PATENT AND TRADEMARK OFFICE
CERTIFICATE OF CORRECTION

PATENT NO. : 6,848,710 B2
APPLICATION NO. : 10/192122
DATED : February 1, 2005
INVENTOR(S) : Fumitoshi Yasuhara et al.

It is certified that error appears in the above-identified patent and that said Letters Patent is hereby corrected as shown below:

Column 12:
    Line 3, change "center pillar CP 2" to --center pillar CP2--.
    Line 34, change "The rear seal-side" to --The rear seat-side--.
    Line 36, delete "FD".
    Line 39, change "with FCU 7" to --with the ECU 7--.
    Line 51, change "vehicle." to --the vehicle.--.
    Line 54, change "of vehicle." to --of the vehicle.--.
    Line 57, change "of vehicle." to --of the vehicle.--.
    Line 59, change "3 SIS signal" to --3SIS signal--.

Column 13:
    Line 1, change "circuits are same" to --circuits are the same--.
    Line 5, change "inflator 6" to --inflator 61--.
    Line 7, change "In the mean time," to --In the meantime,--.
    Line 9, change "ing circuit from" to --ing circuits from--.
    Lines 13-14, change "one of other two" to --one of the other two--.
    Line 29, change "in aforementioned manner." to --in the aforementioned manner.--.
    Line 34, change "intermediate" to --middle--.
    Line 43, change "VB crashed" to --VB crashes--.
    Line 44, change "into to a pole" to --into a pole--; change "MDB crashed" to --MDB crashes--.
    Line 45, change "side of vehicle" to --side of the vehicle--.
    Line 49, change "In the mean time, When" to --In the meantime, when--.
    Line 53, change "received 1SIS" to --receives 1SIS--.
    Line 57, change "of vehicle body." to --of the vehicle body. --.
    Line 58, change "In the mean time," to --In the meantime,--.
    Line 59, change "of side impact" to --of the side impact--.
    Line 61, change "On signal" to --ON signal--.
    Line 64, change "to ECU 7" to --to the ECU 7--.

Column 14:
    Line 11, change "one point chain line" to --one-point chain line--.
    Line 17, change "head protecting" to --head-protecting--.
    Line 18, change "system 5 and 6" to --systems 5 and 6--.
    Line 26, change "vehicle VB crashed" to --vehicle VB crashes--.
    Line 27, change "an MDB crashed" to --an MDB crashes--.
    Lines 27-28, change "of vehicle body," to --of the vehicle body,--.

UNITED STATES PATENT AND TRADEMARK OFFICE
CERTIFICATE OF CORRECTION

PATENT NO. : 6,848,710 B2
APPLICATION NO. : 10/192122
DATED : February 1, 2005
INVENTOR(S) : Fumitoshi Yasuhara et al.

It is certified that error appears in the above-identified patent and that said Letters Patent is hereby corrected as shown below:

Column 14: (cont'd):
    Line 30, change "vehicle VB received" to --vehicle VB receives--.
    Line 32, change "In the mean time," to --In the meantime,--.
    Line 36, change "the ECU 7 received" to --the ECU 7 receives--.
    Line 42, change "In the mean time," to --In the meantime, --.
    Line 44, change "On signal" to --ON signal--.
    Line 63, change "two point chain line" to --two-point chain line--.

Column 15:
    Lines 3-4, change "in these two the head protecting system 4 and 6," to --in the head-protecting systems 4 and 6,--.
    Lines 8-9, change "head protecting systems" to --head-protecting systems--.
    Line 11, change "is around rear" to --is around the rear--.
    Line 12, change "vehicle VB crashed" to --vehicle VB crashes--.
    Line 13, change "an MDB crashed" to --an MDB crashes--.
    Line 16, change "vehicle VB received" to --vehicle VB receives--.
    Line 17, change "seat-head protecting" to --seat head-protecting--.
    Line 18, change "In the mean time," to --In the meantime,--.
    Line 22, change "ECU 7 received" to --ECU 7 receives--.
    Lines 27-28, change "In the mean time," to --In the meantime,--.
    Line 48, change "two point chain line" to --two-point chain line--.
    Line 57, change "occupant-head protecting" to --occupant head-protecting--.
    Line 62, change "seat-head protecting" to --seat head-protecting--.

Column 16:
    Line 2, change "the vehicle received" to --the vehicle receives--.
    Lines 5-6, change "the intermediate" to --the middle--.
    Line 20, change "intermediate occupant," to --middle occupant,--.
    Line 31, change "miniaturized, at" to --miniaturized; at--.
    Line 34, change "in aforementioned style." to --in the aforementioned style.--.
    Line 35, change "to aforementioned style," to --to the aforementioned style,--.
    Line 38, change "the air bag system" to --the airbag system--.
    Line 41, change "in ECU" to --in the ECU--.
    Line 42, change "be comprised as" to --be comprised in--.
    Line 52, change "in following manner." to --in the following manner.--.
    Line 58, change "all of occupant protecting airbags" to --all of the occupant-protecting airbags--.
    Line 64, change "that side impact" to --that the side impact--.

UNITED STATES PATENT AND TRADEMARK OFFICE
CERTIFICATE OF CORRECTION

PATENT NO. : 6,848,710 B2
APPLICATION NO. : 10/192122
DATED : February 1, 2005
INVENTOR(S) : Fumitoshi Yasuhara et al.

It is certified that error appears in the above-identified patent and that said Letters Patent is hereby corrected as shown below:

Column 17:
    Line 1, change "in following manners." to --in the following manners.--.
    Line 2, change "two portions respec-" to --two portions, respec- --.
    Line 11, change "portions respectively." to --portions, respectively.--.
    Line 63, change "a font seat-side" to --a front seat-side--.

Column 18:
    Line 2, change "comprising the stets of:" to --comprising the steps of:--.
    Line 57, change "impact of vehicle;" to --impact of the vehicle;--.
    Line 62, change "the airbag being" to --the airbags being--.

Column 19:
    Line 35, change "the steps or:" to --the steps of:--.
    Line 48, change "middle seat detecting" to --middle seat-detecting--.
    Line 50, change "(2SIS) sigal" to --(2SIS) signal--.
    Line 62, change "as the UIS signal" to --as UIS signal--.

Column 20:
    Line 6, change "signal is OFT," to --signal is OFF,--.
    Line 42, change "vehicle body," to --vehicle body;--.
    Line 46, change "from door of" to --from doors of--.
    Line 57, change "sensor and the sensor" to --sensor arrangement and the sensor--.

Column 21:
    Line 30, change "a font seat-detecting" to --a front seat-detecting--.
    Line 32, change "front seat a" to --front seat, a--.
    Line 46, change "vehicle body and" to --vehicle body, and--.

UNITED STATES PATENT AND TRADEMARK OFFICE
CERTIFICATE OF CORRECTION

PATENT NO.       : 6,848,710 B2
APPLICATION NO. : 10/192122
DATED            : February 1, 2005
INVENTOR(S)      : Fumitoshi Yasuhara et al.

It is certified that error appears in the above-identified patent and that said Letters Patent is hereby corrected as shown below:

<u>Column 22:</u>
Line 39, change "front seaside impact" to --front seat-side impact--.

Signed and Sealed this

Third Day of April, 2007

JON W. DUDAS
*Director of the United States Patent and Trademark Office*